(12) United States Patent
Fukumoto et al.

(10) Patent No.: US 10,655,374 B2
(45) Date of Patent: May 19, 2020

(54) HINGE DEVICE

(71) Applicant: Nifco Inc., Yokosuka-shi, Kanagawa (JP)

(72) Inventors: Mitsuru Fukumoto, Yokosuka (JP); Yoshimi Arai, Yokosuka (JP); Yuhei Chinomi, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 0 days.

(21) Appl. No.: 16/516,350

(22) Filed: Jul. 19, 2019

(65) Prior Publication Data

US 2020/0032566 A1 Jan. 30, 2020

(30) Foreign Application Priority Data

Jul. 26, 2018 (JP) .................................. 2018-140149

(51) Int. Cl.
| | |
|---|---|
| *E05D 7/10* | (2006.01) |
| *B65D 43/16* | (2006.01) |
| *E05D 5/10* | (2006.01) |
| *F16L 3/223* | (2006.01) |

(52) U.S. Cl.
CPC ........... *E05D 7/1022* (2013.01); *B65D 43/16* (2013.01); *E05D 5/10* (2013.01); *F16L 3/223* (2013.01); *E05D 2005/108* (2013.01)

(58) Field of Classification Search
CPC ....... F16L 3/08; F16L 3/00; F16L 3/22; F16L 3/1075; E05D 7/1022
USPC ... 248/689, 49, 56, 58, 60, 62, 63, 65, 67.5, 248/68.1, 71, 73, 74.1, 228.4, 230.4, 248/231.51, 316.5
See application file for complete search history.

(56) References Cited

U.S. PATENT DOCUMENTS

| | | | | |
|---|---|---|---|---|
| 5,184,794 A | * | 2/1993 | Saito ......................... | F16L 3/13 |
| | | | | 248/316.5 |
| 5,568,906 A | * | 10/1996 | Hahn ........................ | F16L 3/12 |
| | | | | 248/229.13 |
| 5,653,411 A | * | 8/1997 | Picco ..................... | F16L 3/2235 |
| | | | | 248/74.1 |
| 5,820,048 A | * | 10/1998 | Shereyk ................ | F16L 3/1215 |
| | | | | 248/68.1 |

(Continued)

FOREIGN PATENT DOCUMENTS

| | | |
|---|---|---|
| JP | S6377184 U | 5/1988 |
| JP | 2002128112 A | 5/2002 |
| KR | 920007344 Y1 | 10/1992 |

*Primary Examiner* — Terrell L McKinnon
*Assistant Examiner* — Michael McDuffie
(74) *Attorney, Agent, or Firm* — Armstrong Teasdale LLP

(57) ABSTRACT

A hinge device includes a base member, a lid member connected to the base member via a hinge structure having a hinge pin and a bearing hole loosely receiving the hinge pin. The base member is provided with a first abutting portion adjacent to the hinge structure, and the lid member is provided with a second abutting portion adjacent to the hinge structure so that the lid member can rotate relative to the base member from an open position to a closed position, the first abutting portion and the second abutting portion being configured to abut each other in a direction orthogonal to an axial line of a hinge axis of the hinge structure when an angle formed by the first member and the second member is within a first angular range preceding the closed position.

8 Claims, 8 Drawing Sheets

(56) References Cited

U.S. PATENT DOCUMENTS

| | | | | |
|---|---|---|---|---|
| 6,053,458 | A * | 4/2000 | Meyer | B29C 45/0017 248/74.1 |
| 6,565,049 | B2 * | 5/2003 | Hahn | B60R 16/0215 248/68.1 |
| 7,387,282 | B2 * | 6/2008 | Kovac | B60R 16/0215 248/55 |
| 7,887,012 | B2 * | 2/2011 | Desai | F16L 3/1075 24/530 |
| 8,020,812 | B2 * | 9/2011 | Matsuno | F16L 3/1075 24/336 |
| 8,672,276 | B2 * | 3/2014 | Fukumoto | F16L 3/2235 248/316.1 |
| 8,882,072 | B2 * | 11/2014 | Hattori | B29C 45/006 248/346.03 |
| 9,416,896 | B1 * | 8/2016 | Kato | F16L 3/222 |
| 9,453,593 | B2 * | 9/2016 | Pearson | F16L 3/223 |
| 10,119,631 | B2 * | 11/2018 | Toll | F16L 3/1075 |
| 2004/0182973 | A1 * | 9/2004 | Kawai | F16L 3/1075 248/71 |
| 2005/0253025 | A1 * | 11/2005 | Benoit | F16L 3/13 248/74.1 |
| 2007/0278358 | A1 * | 12/2007 | Clark | B60R 16/0215 248/74.1 |
| 2012/0153095 | A1 * | 6/2012 | Child | F16L 3/2235 248/68.1 |
| 2012/0318935 | A1 * | 12/2012 | Benedetti | F16L 3/1075 248/74.1 |
| 2013/0009020 | A1 * | 1/2013 | Shirakabe | F16B 37/0842 248/74.1 |
| 2013/0240684 | A1 * | 9/2013 | Meyers | F16L 3/2235 248/74.1 |
| 2017/0227141 | A1 * | 8/2017 | Toll | F16L 3/12 |

* cited by examiner

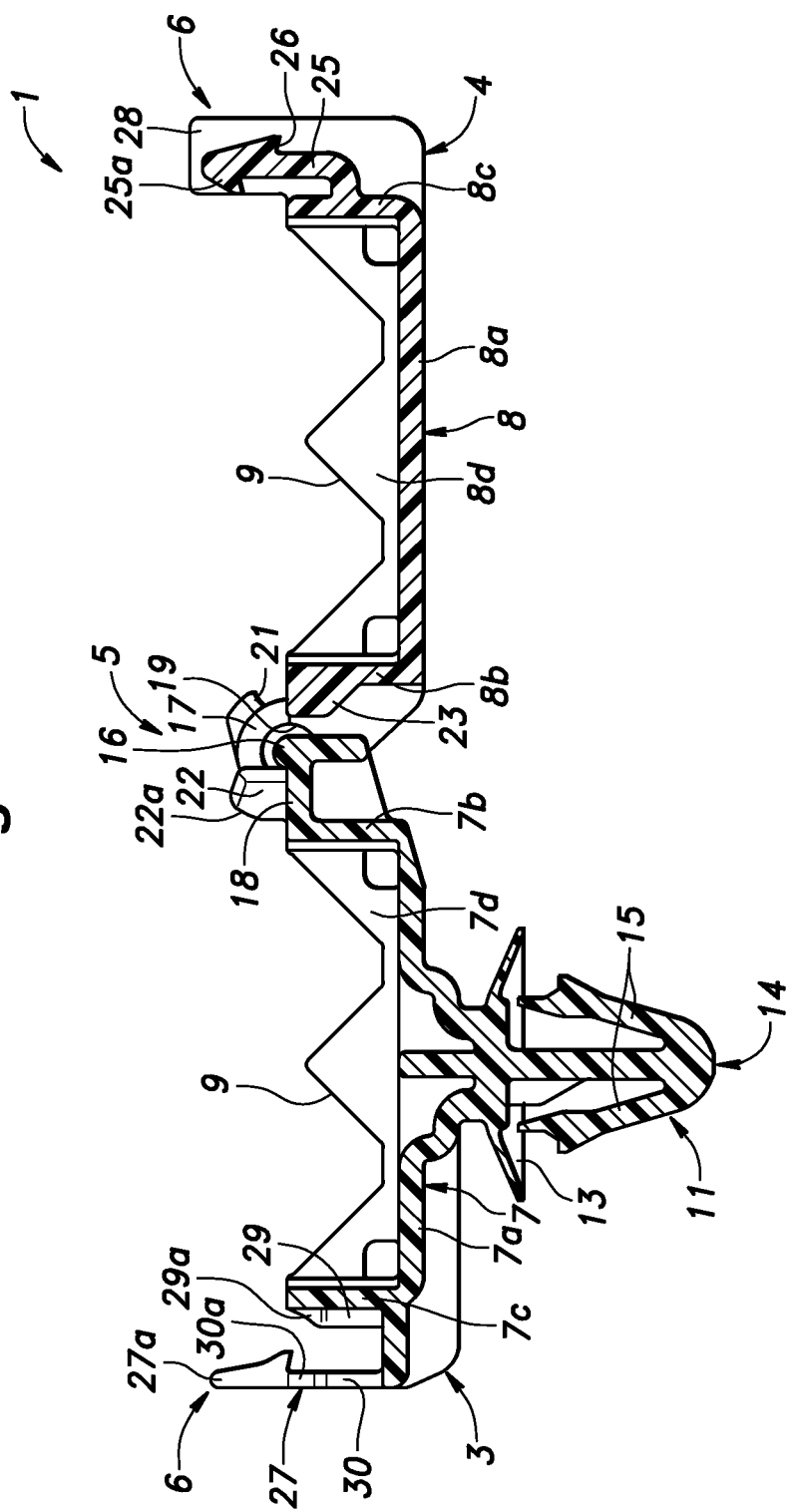

HINGE DEVICE

TECHNICAL FIELD

The present invention relates to a hinge device having a hinge structure in which a hinge pin is loosely fitted in a bearing hole.

BACKGROUND ART

In a molding process for molding a clamp having a hinge structure by resin, the mold may include a first mold part for molding a hinge pin and a second mold part for molding a component having a bearing hole so that the entire hinge structure may be molded by a single-shot molding process. In such a case, for the hinge pin and the component defining the bearing hole to be molded at the same time, a certain gap is required between the hinge pin and the bearing hole. Therefore, a certain amount of play is inevitable between the hinge pin and the bearing hole.

JPS63-77184U and JP2002-128112A disclose a clamp for securing piping on a lower side of a vehicle body, and these clamps are provided with a hinge structure in which a hinge pin is loosely received in a bearing hole. According to these prior inventions, the clamp includes a base member, and a lid member connected to the base member via a hinge so as to be movable between a closed position and an open position. In the case of the clamp disclosed in JPS63-77184U, an engagement claw provided on the lid member engages a corresponding stopper provided on the base member in the closed position of the clamp so that the lid member is not only retained in the closed position, but also the engagement claw is prevented from moving laterally (along the axial direction of the hinge pin). Thereby, the movement of the lid member relative to the base member in the closed position of the clamp can be avoided. In the case of the clamp disclosed in JP2002-128112A, a latch consisting of engagement features provided on the outer surface of the hinge pin and the inner surface of the bearing hole is provided between the lid member and the base member so as to be engaged in the closed position of the clamp. Therefore, once the clamp is closed, the movement of the lid member relative to the base member can be avoided.

Thus, according to these previously proposed clamps, the movement of the lid member relative to the base member can be prevented when the clamp is closed or is clamping an object such as a pipe, but the lid member is freely movable relative to the base member (in directions orthogonal to the axis of the hinge pin) before the clamp is closed. Therefore, during the process of closing the clamp, the lid member is movable relative to the base member so that the latch may not be engaged in a reliable manner, and/or the lid member and the base member may not be properly positioned relative to the object to be clamped such as a pipe. In particular, the work efficiency in closing the clamp may be impaired because the worker is required to pay attention to the positioning of the lid member relative to the base member when closing the clamp.

SUMMARY OF THE INVENTION

In view of such a problem of the prior art, a primary object of the present invention is to provide a hinge device having a hinge structure having a hinge pin and a bearing hole loosely receiving the hinge pin, such that the hinge device can be closed in a stable and accurate manner without undesired relative movement between members connected to each other via the hinge structure.

Another object of the present invention is to provide a clamp using such a hinge device.

To achieve such an object, one aspect of the present invention provides a hinge device, comprising: a first member (3) having a hinge pin (16) extending in a lateral direction; and a second member (4) having a bearing portion (17) defining a bearing hole (19) loosely receiving the hinge pin so that the first and second members can rotate relative to each other from an open position to a closed position, the bearing hole forming a hinge structure (5) jointly with the hinge pin; wherein the first member is provided with a first abutting portion (20) adjacent to the hinge pin, and the second member is provided with a second abutting portion (21) adjacent to the bearing hole, the first abutting portion and the second abutting portion being configured to abut each other in a direction orthogonal to an axial line of the hinge pin when an angle formed by the first member and the second member is within a first angular range preceding the closed position.

According to this arrangement, even though the bearing hole loosely receives the hinge pin, the relative movement between the first member and the second member can be restricted over the first angular range preceding the closed position; namely, the hinge device can be free from play over the first angular range in the process of closing the hinge device. Thus, according to this arrangement, there is provided a hinge device having a hinge structure having a hinge pin and a bearing hole loosely receiving the hinge pin, such that the hinge device can be closed in a stable and accurate manner without undesired relative movement between members connected to each other via the hinge structure.

According to a preferred embodiment of the present invention, one of a part of the first member adjacent to the hinge pin and a part of the second member adjacent to the bearing hole is provided with a first projection (22) which is configured to abut an engagement part (8b) provided on another of the part of the first member adjacent to the hinge pin and the part of the second member adjacent to the bearing hole when the angle formed by the first member and the second member is within a second angular range preceding the closed position, wherein the first angular range and the second angular range at least partly overlap with each other, and a force applied to the second member by an abutment between the first projection and the engagement part contains a component which is directed in an opposite direction from a force applied to the second member by an abutment between the first abutting portion and the second abutting portion.

Thereby, even though the bearing hole loosely receives the hinge pin, the relative movement between the first member and the second member can be restricted more effectively over a certain angular range preceding the closed position. In particular, by suitably selecting the directions of the force created by the abutment between the first abutting portion and the second abutting portion and the force created by the abutment between the first projection and the engagement part, the resultant composite force formed by combining these forces can be directed in a desired direction.

Preferably, the first abutting portion includes a pair of first abutting portions laterally spaced from each other along the hinge pin of the first member, and the second abutting portion includes a pair of second abutting portions laterally spaced from each other along the bearing hole of the second member, the first projection being provided between the first abutting portions or between the second abutting portions. More preferably, the first projection is provided between the pair of first abutting portions or between the second abutting portions.

Thereby, the lateral movement or the laterally tilting movement between the first member and the second member can be prevented so that the hinge device can be operated in a stable manner.

Preferably, the first projection includes a pair of first projections laterally spaced from each other, and the engagement part includes a second projection that can be received between the first projections.

Thereby, the lateral movement or the laterally tilting movement between the first member and the second member can be prevented so that the hinge device can be operated in a stable manner.

Preferably, a tip part (22a) of the first projection that comes into abutment with the engagement part as the first and second members rotate relative to each other toward the closed position is rounded or tapered.

This arrangement contributes to allowing the slidable abutment between the first projection and the engagement part to be performed smoothly and stably.

Preferably, the hinge device further comprises a latch mechanism (6) for selectively engaging ends of the first member and the second member remote from the hinge structure with each other to maintain the closed position of the first and second members, the latch mechanism comprising: an engagement portion (24) provided in a part of the first member remote from the hinge structure so as to project away from the hinge pin; and a first engagement claw (25) extending in a closing direction from a part of the second member remote from the hinge structure and having a tip end projecting toward the bearing hole and configured to be engaged by the engagement portion in the closed position of the first and second members, wherein one of the first abutting portion and the second abutting portion is formed with an undercut recess (31) configured to at least partly receive the other of the first abutting portion and the second abutting portion when the first and second members are adjacent to the closed position.

In this arrangement, immediately before the closed position, as the tip end of the first engagement claw rides over the engagement portion, the first member and the second member are caused to move relative to each other along a longitudinal line orthogonal to the axial line of the hinge structure. Such a movement is accommodated by the undercut recess receiving the corresponding one of the abutting portions. As a result, the latching of the latch member can be accomplished in a smooth manner while maintaining the abutment between the first abutting portion and the second abutting portion up to a point immediately preceding the closed position.

Preferably, the engagement portion and/or the first engagement claw is provided with resiliency so that the undercut recess receives the other of the first abutting portion and the second abutting portion when the first and second members are in the closed position.

Thereby, the latch mechanism can be latched in a highly stable manner while accurately defining the closed position.

Another aspect of the present invention provides a clamp, comprising: the hinge device as defined above; and a latch mechanism (6) configured to selectively engage ends of the first member and the second member remote from the hinge structure with each other to maintain the closed position of the first and second members to clamp an object between the first member and the second member; the clamp being configured such that a reaction applied by the clamped object to the first member and the second member in the closed position causes the hinge pin to be pressed against a predetermined part of the bearing portion defining the bearing hole; wherein the first abutting portion and the second abutting portion are configured to abut each other when the angle formed by the first member and the second member corresponds to a prescribed state of the clamp preceding the closed position in such a manner that a force directed to press the hinge pin onto a substantially same part of the bearing portion defining the bearing hole as the predetermined part is created by an abutment between the first abutting portion and the second abutting portion.

When the clamp is closed, the clamped object applies a reaction that tends to push the first member and the second member away from each other. As a result, the hinge pin is pushed against a predetermined part of the bearing portion defining the bearing hole. However, since the hinge pin is loosely received in the bearing hole, if no arrangement is made, the hinge pin may be located in a part of the bearing hole other than the predetermined part of the bearing portion defining the bearing hole before the clamp is closed (or before the clamp engages the object to be clamped and receives the reaction from the object). If that is the case, there may be a movement of the hinge pin in the bearing hole as the clamp is about to engage the object in the process of closing the clamp. This is not desirable because there may be an unpredictable movement of the first and second members relative to each other when the clamp is about to engage the object. However, according to the above arrangement based on the inventive concept of the present invention, because a force directed to press the hinge pin onto the substantially same part of the bearing portion defining the bearing hole as the predetermined part is created by the abutment between the first abutting portion and the second abutting portion before the clamp is closed, the movement of the clamp before engaging the object to be clamped can be performed in a predictable way without the hinge pin moving about in the bearing hole so that the clamp can be closed in a stable and accurate manner.

Yet another aspect of the present invention provides a clamp, comprising: the hinge device as defined above; and a latch mechanism (6) configured to selectively engage ends of the first member and the second member remote from the hinge structure with each other to maintain the closed position of the first and second members to clamp an object between the first member and the second member; wherein one of a part of the first member adjacent to the hinge pin and a part of the second member adjacent to the bearing hole is provided with a first projection which is configured to abut an engagement part provided on another of the part of the first member adjacent to the hinge pin and the part of the second member adjacent to the bearing hole when an angle formed by the first member and the second member is within a second angular range preceding the closed position, the clamp being configured such that a reaction applied by the clamped object to the first member and the second member in the closed position causes the hinge pin to be pressed against a predetermined part of the bearing portion defining the bearing hole, wherein the first abutting portion and the second abutting portion are configured to abut each other when the angle formed by the first member and the second member corresponds to a prescribed state of the clamp preceding the closed position, and the first projection and the engagement part are configured to abut each other when the angle formed by the first member and the second member corresponds to the prescribed state of the clamp preceding the closed position in such a manner that a force directed to press the hinge pin onto a substantially same part of the bearing portion defining the bearing hole as the predetermined part is created jointly by an abutment between the first abutting portion and the second abutting portion and an abutment between the first projection and the engagement part.

In this arrangement also, because a force directed to press the hinge pin onto the substantially same part of the bearing portion defining the bearing hole as the predetermined part is created jointly by the abutment between the first abutting portion and the second abutting portion and the abutment between the first projection and the engagement part before the clamp is closed, the movement of the clamp before engaging the object to be clamped can be performed in a predictable way without the hinge pin moving about in the bearing hole so that the clamp can be closed in a stable and accurate manner.

BRIEF DESCRIPTION OF THE DRAWINGS

FIG. 3 is a sectional view of the clamp in the open position taken along a plane orthogonal to a hinge axis;

DESCRIPTION OF THE PREFERRED EMBODIMENT(S)

A clamp 1 including a hinge device having a novel hinge structure according to an embodiment of the present invention is described in the following with reference to the appended drawings.

Figure 1:
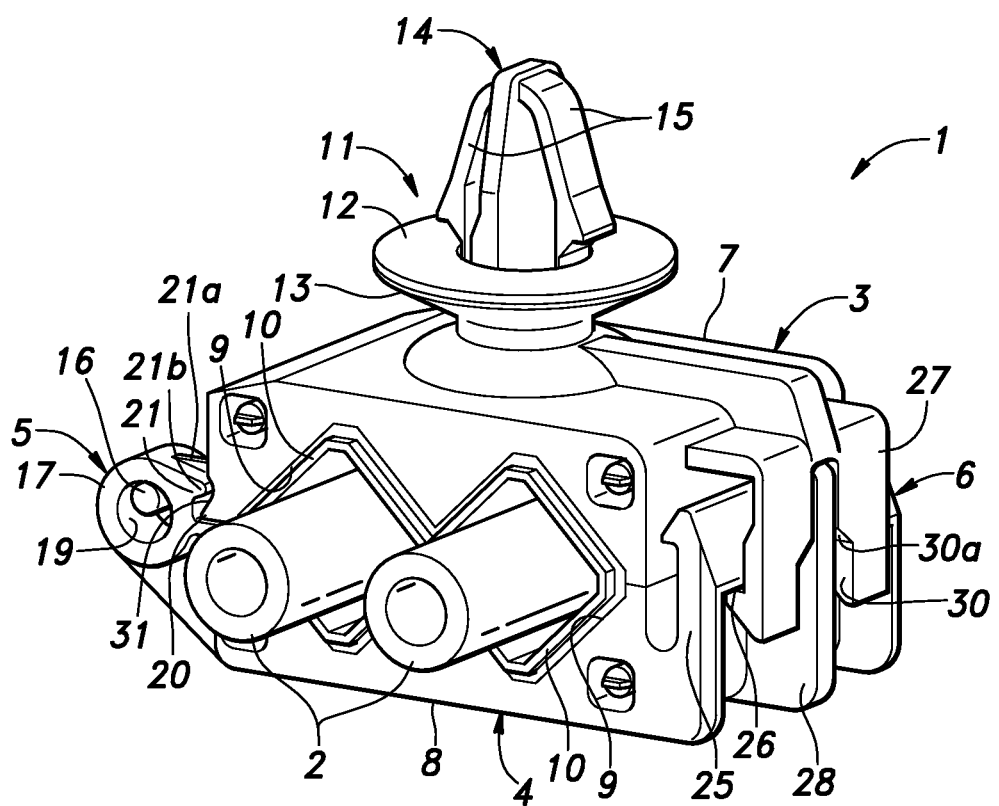
FIG. 1 is a perspective view of a clamp including a hinge device according to an embodiment of the present invention in a closed position.

FIG. 1 is a perspective view of the clamp 1 in a closed position. The clamp 1 is used to secure a pipe 2 or the like in a lower part of a vehicle body or the like. The clamp 1 includes a base member 3 configured to be attached to the vehicle body, and a lid member 4 hinged to the base member 3. The base member 3 and the lid member 4 are connected to each other at respective one ends thereof via a hinge structure 5, and are provided with a latch mechanism 6 configured to join the other ends of the base member 3 and the lid member 4 to each other so as to prevent relative rotation between the base member 3 and the lid member 4. The base member 3 and the lid member 4 each extend in a longitudinal direction, and the hinge structure 5 is provided with a laterally extending hinge axis.

Figure 2:
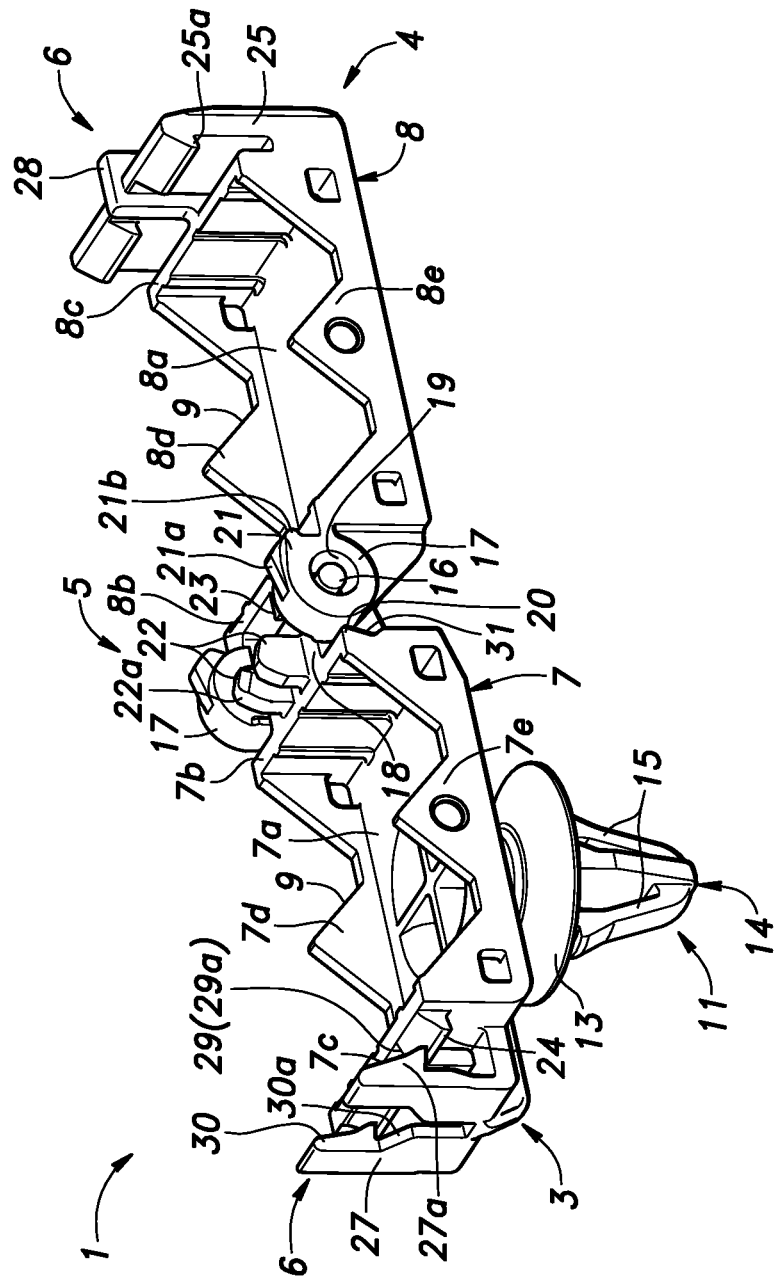
FIG. 2 is a perspective view of the clamp in an open position.

FIG. 2 shows the clamp 1 in a fully open position in which the one ends of the base member 3 and the lid member 4 are joined to each other at the hinge structure 5, and the base member 3 and the lid member 4 extend along a substantially straight line (extending in the longitudinal direction) with the other ends of the base member 3 and the lid member 4 located away from each other along this substantially straight line.

The base member 3 is provided with a base main body 7 which includes a bottom wall 7a having a rectangular shape elongated in the longitudinal direction with the short sides of the bottom wall 7a extending in parallel with the hinge axis of the hinge structure 5, and four side walls 7b to 7e extending upright from the four edges of the bottom wall 7a, respectively. The four side walls 7b to 7e include the first side wall 7b located on the edge of the short side of the bottom wall 7a adjacent to the hinge axis, the second side wall 7c located on the edge of the short side of the bottom wall 7a remote from the hinge axis, the third side wall 7d located on the edge of one of the long sides of the bottom wall 7a, and the fourth side wall 7e located on the edge of the other long side of the bottom wall 7a. Similarly, the lid member 4 is provided with a lid main body 8 which includes a bottom wall 8a having a rectangular shape elongated in the longitudinal direction with the short sides of the bottom wall 8a extending in parallel with the hinge axis of the hinge structure 5, and four side walls 8b to 8e extending upright from the four edges of the bottom wall 8a, respectively. The four side walls 8b to 8e include the first side wall 8b located on the edge of the short side of the bottom wall 8a adjacent to the hinge axis, the second side wall 8c located on the edge of the short side of the bottom wall 8a remote from the hinge axis, the third side wall 8d located on the edge of one of the long sides of the bottom wall 8a, and the fourth side wall 8e located on the edge of the other long side of the bottom wall 8a. The bottom wall 7a of the base main body 7 and the bottom wall 8a of the lid main body 8 are substantially conformal to each other.

The side walls 7d, 7e, 8d and 8e extending along the long sides of the bottom walls 7a and 8a are each formed with a pair of V-shaped notches 9 next to each other so that when the clamp 1 is closed, and the side walls 7d and 7e of the base member 3 and the side walls 8d and 8e of the lid member 4, respectively, abut one another, the notches 9 jointly define rhombic openings, two on each side, on the side walls of the clamp 1 in the closed position. As shown in FIG. 1, an elastic member 10 made of rubber or any other elastomeric material is attached to each of the linear edges defining the notches 9 (in FIGS. 2 and 3, the elastic members 10 are omitted from illustration). When the clamp 1 is closed, the linear edges defining the notches 9 abut against a pair of pipes to be clamped via the elastic members 10 to fixedly secure the pipes.

The base main body 7 of the base member 3 is provided with a mounting portion 11 protruding from the center of the bottom wall 7a of the base main body 7 on the side thereof facing away from the side walls 7b to 7e. As shown in FIG. 4, the mounting portion 11 includes a dish-shaped abutting portion 13 having a concave side thereof facing away from the bottom wall 7a, and an engagement claw 14 projecting centrally from the concave side of the abutting portion 13. The engagement claw 14 is provided with a pair of elastic barbs 15 projecting obliquely from the free end of the engagement claw 14 toward the abutting portion 13 on either side. When the engagement claw 14 is inserted into a mounting hole 33 provided in a panel member 32 of a vehicle body, for instance, the elastic barbs 15 resiliently retracts toward each other as the engagement claw 14 is pushed into the mounting hole 33, and once the barbs 15 clear the mounting hole 33, the barbs 15 resiliently restore the original shape thereof so that the engagement claw 14 is retained on the side of the panel member 32 opposite to the side on which the abutting portion 13 abuts. The resilience of the dish-shaped abutting portion 13 and the elastic barbs 15 ensures that the mounting portion 11 is firmly retained to the panel member 32 substantially without any play. As shown in FIG. 4B, a washer 12 made of elastomeric material may be interposed between the dish-shaped abutting portion 13 and the part of the opposing surface of the panel member 32 surrounding the mounting hole 33.

As best shown in FIGS. 1 and 2, the hinge structure 5 includes a hinge pin 16 provided on the base member 3, and a pair of bearing portions 17 provided on the lid member 4. An extension wall 18 extends centrally from the free end of the side wall 7b adjacent to the hinge structure 5 toward the hinge structure 5 in parallel with the bottom wall 7a, and the hinge pin 16 projects laterally from either side of the extension wall 18. The lateral edges of the extension wall 18 are short of the respective lateral edges of the side wall 7b. The distance between the hinge pin 16 (or the center thereof) and the bottom wall 7a is substantially equal to the height of the side walls 7b to 7e.

The pair of bearing portions 17 extend from the free end of the side wall 8b adjacent to the hinge structure 5 into spaces defined on either side of the extension wall 18. Each bearing portion 17 is formed with a bearing hole 19 configured to loosely receive the corresponding end of the hinge pin 16. The distance between the center of the bearing holes 19 and the bottom wall 8a is substantially equal to the height of the side walls 8b to 8e. Since each bearing hole 19 loosely receives the corresponding end of the hinge pin 16, in the fully open position of the clamp 1, the lid member 4 can be moved relative to the base member 3 in directions orthogonal to the hinge axis to an extent permitted by the play created between the hinge pin 16 and the bearing holes 19. The spacing between the opposing surfaces of the bearing portions 17 is substantially equal to the lateral width of the extension wall 18 so that the lid member 4 is prevented from moving laterally (or in the direction along the hinge axis) with respect to the base member 3. However, some clearance may be defined between the extension wall 18 and the opposing surfaces of the bearing portions 17 without departing from the spirit of the present invention.

A pair of first abutting portions 20 are provided on either lateral end part of the side wall 7b adjacent to the hinge structure 5. Each first abutting portion 20 is located in an upper end of the associated lateral end part of the side wall 7b, and an undercut recess 31 is formed immediately below the first abutting portion 20. Each bearing portion 17 is provided with a second abutting portion 21 consisting of a projection projecting radially outward from an outer peripheral part of the bearing portion 17. The second abutting portion 21 is located in an angular range of about 45 to 60 degrees in counterclockwise direction from the extending direction of the lid member 4 in FIG. 3. The second abutting portion 21 is provided with a crest portion 21a having a smaller width and a greater projecting height than the second abutting portion 21 and projecting laterally centrally from the second abutting portion 21. The crest portion 21a is generally rounded on the side thereof facing toward the base member 3, and is provided with a relatively sharp peak 21b on the side thereof facing toward the lid member 4. The crest portions 21a of the second abutting portions 21 are configured to slidably abut against the respective first abutting portions 20 over a first angular range of the lid member 4 relative to the base member 3 preceding the closed position in the process of closing the lid member 4 (or the clamp 1).

The extension wall 18 is further provided with a pair of first projections 22 projecting orthogonally and laterally centrally from the upper surface thereof as viewed in FIG. 3 in a mutually spaced apart relationship. The tip end 22a of each first projection 22 is rounded. The tip ends 22a of the first projections 22 slidably abut against the tip end of the side wall 8b of the lid member 4 adjacent to the hinge structure 5 over a second angular range of the lid member 4 relative to the base member 3 preceding the closed position in the process of closing the lid member 4 (or the clamp 1).

The first angular range and the second angular range at least partly overlap with each other. As measured from the extended position (fully open position) illustrated in FIG. 3, these angular ranges are typically located within the last 90 degrees of the rotational angle of the lid member 4 relative to the base member 3 preceding the closed position or between 90 degrees and 180 degrees from the fully open position. In the overlapping region of the first angular range and the second angular range, the abutment between the first abutting portions 20 and the second abutting portions 21 creates a rightward force applied to the lid member 4 in FIG. 4 while the abutment between the first projections 22 and the side wall 8b creates an upward and leftward force applied to the lid member 4 in FIG. 4. These forces are combined into a force that urges a lower left side of the bearing hole 19 of each bearing portion 17 (predetermined part of the bearing portion 17 defining the bearing hole 19) toward and against the hinge pin 16 so that there is no play between the hinge pin 16 and the bearing hole 19. The roundings formed in the crest portions 21a of the second abutting portions 21 and the tip ends 22a of the first projections 22 allow the lid member 4 to enter the first angular range and the second angular range, respectively, in a smooth manner, and also contribute to allowing the slidable abutment between the first abutting portions 20 and the second abutting portions 21 and between the first projections 22 and the side wall 8b to be performed smoothly and stably.

As shown in FIGS. 2 and 3, a second projection 23 projects laterally centrally from the outer surface of the side wall 8b of the lid member 4. The second projection 23 has a width equal to or slightly smaller than the spacing between the first projections 22 so that in the closed position or in an angular range slightly preceding from the closed position, the second projection 23 is snugly received in the gap created between the first projections 22 so that the part of the lid member 4 adjacent to the hinge structure 5 is prevented from moving laterally and tilting laterally relative to the base member 3.

As shown in FIGS. 1 to 3, the latch mechanism 6 includes a first engagement claw 25 extending out from a lower part of the side wall 8c of the lid member 4 remote from the hinge structure 5 rightward and then upward in FIG. 3 (or in a closing direction), a first engagement portion 24 projecting from an upper part of the side wall 7c of the base member 3 remote from the hinge structure 5, and a second engagement claw 27 extending from a part of the side wall 7c below the first engagement portion 24 leftward and then upward in FIG. 3.

The first engagement portion 24 is provided with a bottom surface extending substantially in parallel with the bottom wall 7a and a sloped surface facing in the leftward and upward direction in FIG. 3. The first engagement claw 25 is provided with a barb (tip end) 25a projecting toward the hinge structure 5 and having a sloped surface facing in a leftward and upward direction in FIG. 3 and a bottom surface substantially in parallel with the bottom wall 8a of the lid member 4. The first engagement claw 25 is further provided with a second engagement portion 26 in a vertically middle part thereof on a side opposite to that on which the barb 25a is provided, such that the second engagement portion 26 projects in a direction away from the hinge structure 5.

The second engagement portion 26 is provided with a sloped surface facing in a rightward and upward direction in FIG. 3 and a bottom surface extending substantially in parallel with the bottom wall 8a of the lid member 4. The second engagement claw 27 is similarly provided with a barb 27a projecting toward the hinge structure 5 and having a sloped surface facing in a rightward and upward direction in FIG. 3 and a bottom surface extending substantially in parallel with the bottom wall 7a of the base member 3.

Thus, when the lid member 4 is closed onto the base member 3, the barb 25a of the first engagement claw 25 rides over the sloped surface of the first engagement portion 24, and the bottom surface of the first engagement portion 24 then becomes engaged by the bottom surface of the barb 25a of the first engagement claw 25. At the same time, the second engagement portion 26 rides over the sloped surface of the barb 27a of the second engagement claw 27, and the bottom surface of the second engagement portion 26 becomes engaged with the bottom surface of the barb 27a of the second engagement claw 27. In this fully closed position, the first engagement claw 25 is urged toward the adjoining side wall 7c of the base member 3 by the resilient restoring force of the second engagement claw 27 so that the engagement between the first engagement claw 25 and the first engagement portion 24 can be maintained in a reliable manner, and the relative movement between the base member 3 and the lid member 4 in the lengthwise direction (the longitudinal direction) is substantially prohibited.

As shown in FIGS. 1 to 3, an engagement wall 28 extending orthogonally relative to the lateral direction is provided in a laterally central part of the first engagement claw 25, such that the engagement wall 28 extends beyond the right end and the left end of the first engagement claw 25 in FIG. 3. In particular, as viewed in FIG. 3, the left end of the engagement wall 28 extends leftward beyond the main part of the first engagement claw 25, and is substantially flush with the corresponding tip end of the barb 25a thereof.

The side wall 7c of the base member 3 adjacent to the latch mechanism 6 is provided with a first slot 29 extending vertically and laterally centrally on the outer surface of the side wall 7c, and the second engagement claw 27 is provided with a second slot 30 extending laterally centrally and vertically through the second engagement claw 27. The first slot 29 is provided with a pair of side walls 29a that are slanted so that the lateral width of the first slot 29 progressively increases toward an upper end thereof. The lateral width of a lower part of the first slot 29 is substantially equal to or slightly greater than the lateral width of the engagement wall 28. Similarly, the second slot 30 is provided with a pair of side walls 30a that are slanted so that the lateral width of the second slot 30 progressively increases toward an upper end thereof. The lateral width of a lower part of the second slot 30 is substantially equal to or slightly greater than the lateral width of the engagement wall 28. Therefore, when the lid member 4 is closed upon the base member 3, at the same time as the latch mechanism 6 is engaged, the engagement wall 28 is received in the first slot 29 and the second slot 30 so that the lateral movement and lateral tilting between the base member 3 and the lid member 4 is positively restricted. As the first slot 29 and the second slot 30 are each provided with a wider upper end, the insertion of the engagement wall 28 into the first slot 29 and the second slot 30 is facilitated.

As the lid member 4 is closed upon the base member 3, the barb 25a of the first engagement claw 25 rides over the sloped surface of the first engagement portion 24 as mentioned earlier. Therefore, at this time, the lid member 4 is urged toward the latch mechanism 6 or leftward in FIG. 3, and the undercut recess 31 accommodates the leftward movement of the lid member 4 relative to the base member 3 by receiving the second abutting portion 21 (in particular the sharp peak 21b of the crest portion 21a thereof) therein in the course of the movement of the barb 25a of the first engagement claw 25 to ride over the sloped surface of the first engagement portion 24.

When the barb 25a of the first engagement claw 25 has ridden over the sloped surface of the first engagement portion 24, and the bottom surfaces of the barb 25a and the first engagement portion 24 have come to be engaged with each other, the sharp peak 21b may be either still received in the undercut recess 31 or positioned out of the undercut recess 31. It is however desirable that the sharp peak 21b be still received in the undercut recess 31 because the force that may act between the base member 3 and the lid member 4 as a result of a reaction from the clamped object can be firmly supported by the base member 3 and the lid member 4 (particularly in a part thereof adjacent to the hinge structure 5) owing to the engagement between the sharp peak 21b and the undercut recess 31.

The base member 3 and the lid member 4 may be made of injection molded plastic members. These members may be individually molded, and assembled together, but more preferably molded by a single-shot molding process so that the two members may be formed in a same mold with the hinge pin 16 received in the bearing holes 19.

The mode of operation of the clamp 1 is described in the following with reference to FIGS. 3 to 8.

In the fully open position illustrated in FIG. 3, the base member 3 and the lid member 4 extend along a line (in the longitudinal direction) and form an angle of 180 degrees.

Figure 4A:
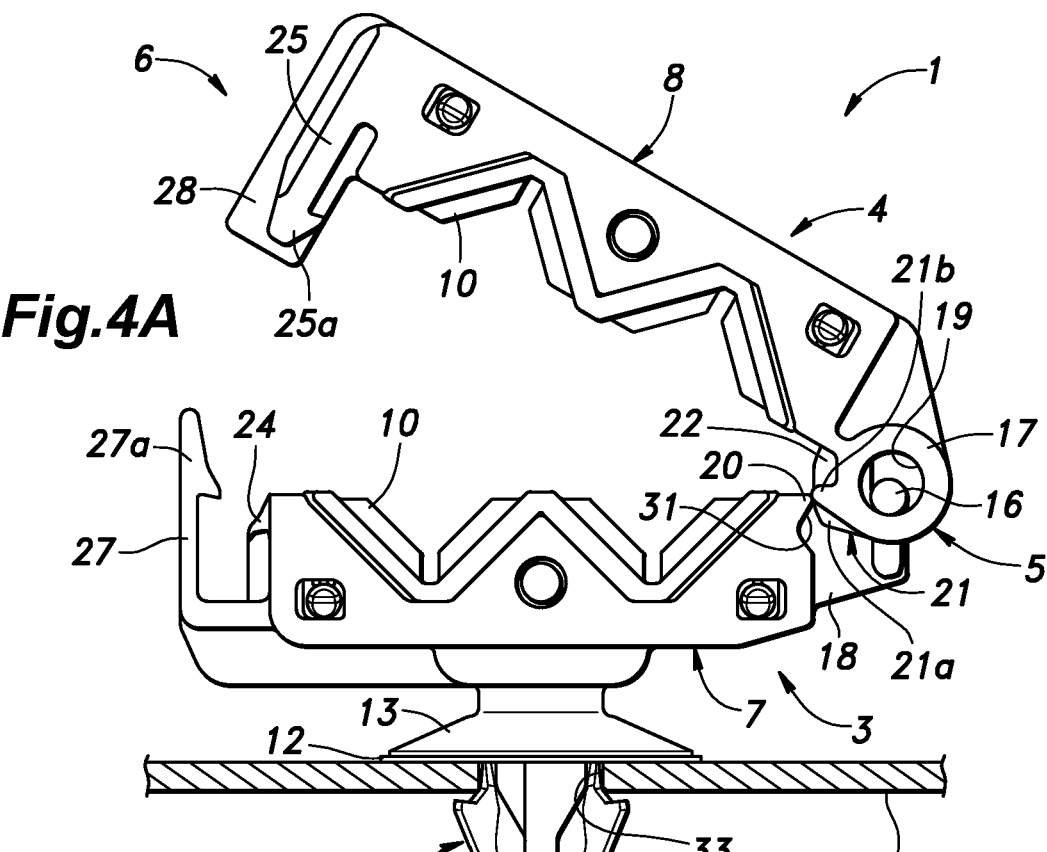
FIG. 4A is a front view of the clamp in a first intermediate position.
Figure 4B:
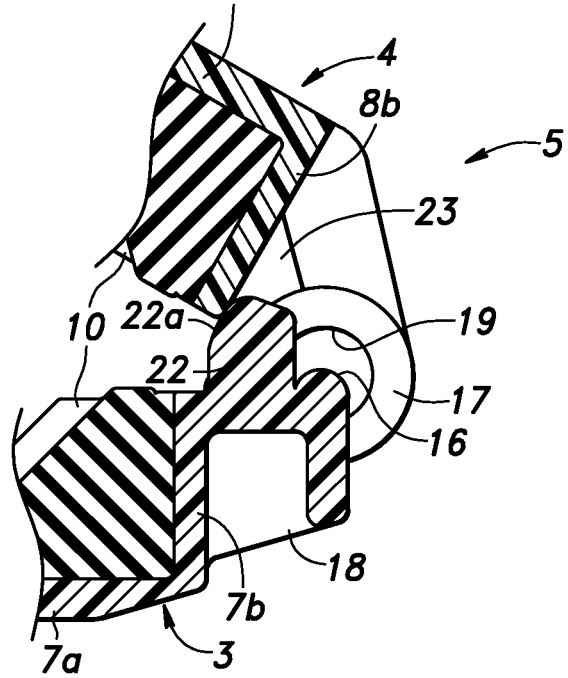
FIG. 4B is an enlarged fragmentary sectional view of a hinge structure of the clamp in the first intermediate position.

When the lid member 4 is closed upon the base member 3 to a first intermediate position shown in FIGS. 4A and 4B where the base member 3 and the lid member 4 form an angle of about 30 degrees, the second abutting portions 21 come into abutment with the first abutting portions 20 so that the lid member 4 receives a rightward force from the base member 3 in FIG. 4A. At the same time or with a certain time difference (or an angular difference), the first projections 22 come into abutment with the side wall 8b of the lid member 4 so that the lid member 4 receives a leftward and upward force from the base member 3 as shown in FIG. 4B. Thus, these forces contain components that are directed in opposite directions along the line extending in parallel with the bottom wall 7a of the base member 3 so that relative movement between the base member 3 and the lid member 4 in the direction along the bottom wall 7a and lateral tilting between the base member 3 and the lid member 4 can be prevented. Further, the composite force given by the combination of the force created by the abutment between the first abutting portion 20 and the second abutting portion 21 and the force created by the abutment between the first projection 22 and the side wall 8b urges the hinge pin 16 generally downward in FIGS. 4 and 5 against a prescribed part on the inner periphery of the bearing holes 19 in a stable manner. As a result, the lid member 4 is prevented from moving in an unpredictable manner. Also, since the second projection 23 is interposed between the first projections 22, the lateral movement of the lid member 4 relative to the base member 3 at the hinge structure 5 is favorably restricted.

Figure 5A:
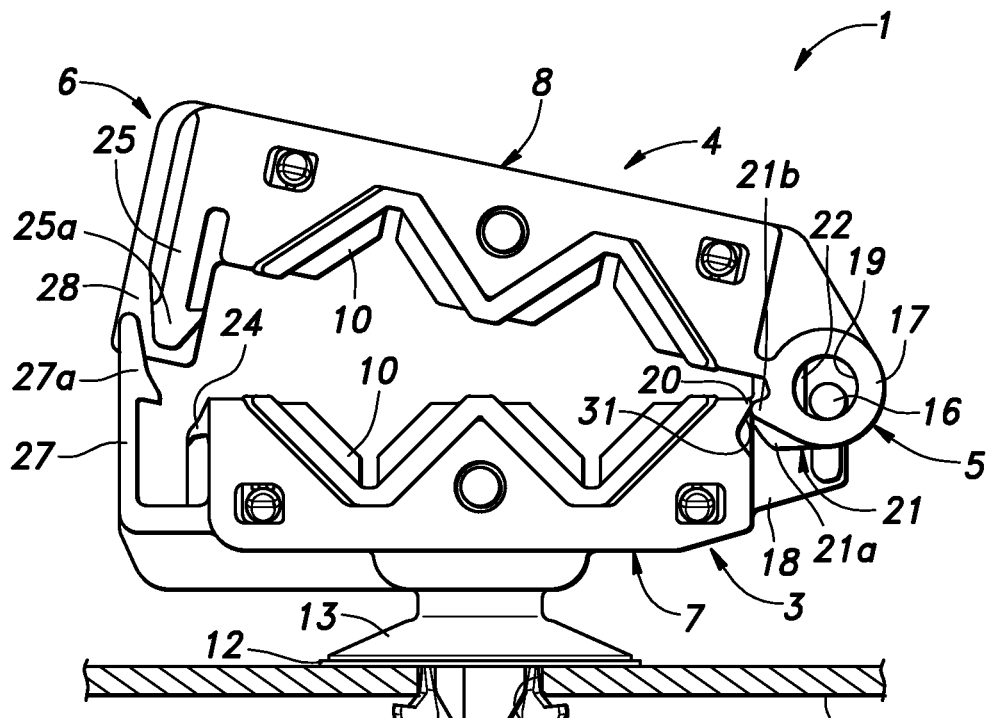
FIG. 5A is a front view of the clamp in a second intermediate position.
Figure 5B:
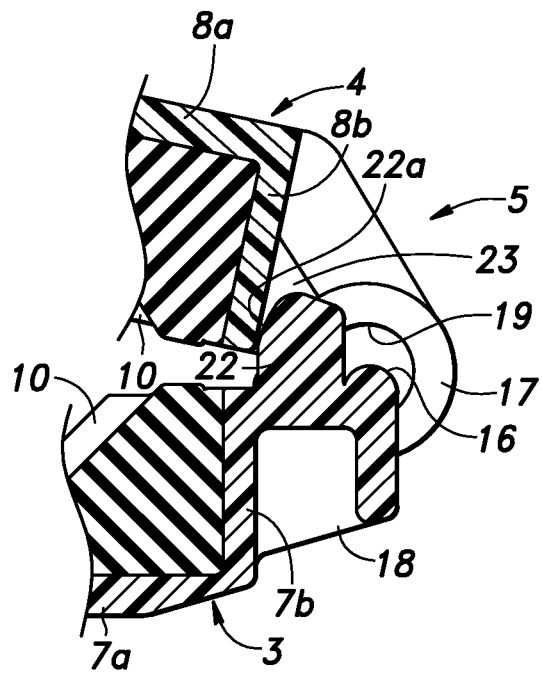
FIG. 5B is an enlarged fragmentary sectional view of the hinge structure of the clamp in the second intermediate position.

When the lid member 4 is closed upon the base member 3 further to a second intermediate position shown in FIGS. 5A and 5B where the base member 3 and the lid member 4 form an angle of about 12 degrees, the second abutting portions 21 are still in abutment with the first abutting portions 20, and the first projections 22 are still in abutment with the side wall 8b of the lid member 4. Therefore, the lid member 4 is allowed to undergo an angular movement relative to the base member 3 in a predictable and stable manner. At this time, the engagement wall 28 is received by the first slot 29 and the second slot 30 aided by the wider upper ends of the first slot 29 and the second slot 30.

It is to be noted that when the clamp 1 is closed or about to be closed in this manner, the clamped object such as pipes (not shown in FIGS. 5A and 5B) applies a reaction that tends to push the base member 3 and the lid member 4 away from each other. As a result, the hinge pin 16 is pushed against a predetermined part of the bearing portion 17 defining the bearing hole 19. However, since the hinge pin 16 is loosely received in the bearing hole 19, if no arrangement is made, the hinge pin 16 may be located in a part of the bearing hole 19 other than the predetermined part of the bearing portion 17 defining the bearing hole 19 before the clamp 1 is closed (or the clamp 1 engages the object to be clamped and receives the reaction from the object). If that is the case, there may be a movement of the hinge pin 16 in the bearing hole 19 as the clamp 1 is about to engage the object in the process of closing the clamp 1. This is not desirable because there may be an unpredictable movement of the lid member 4 relative to the base member 3 when the clamp 1 is about to engage the object. However, according to the illustrated embodiment, because a force directed to press the hinge pin 16 onto the substantially same part of the bearing portion 17 defining the bearing hole 19 as the predetermined part of is created by the abutment between the first abutting portion 20 and the second abutting portion 21 and the abutment between the first projection 22 and the side wall 8b over a prescribed angular range shortly before the clamp 1 is closed, the movement of the clamp 1 shortly before reaching the closed state can be performed in a predictable way without the hinge pin 16 moving about in the bearing hole 19 so that the clamp 1 can be closed in a stable and accurate manner.

The angular range over which the force directed to press the hinge pin 16 substantially onto the predetermined part of the bearing portion 17 defining the bearing hole 19 may be preferably selected such that this force is initiated before the clamp 1 engages the object to be clamped and starts receiving a reaction from the object. Thereby, the clamp 1 can be closed to clamp the object without involving any unstable movement at the hinge structure 5. It is also desirable that the angular range is selected such that the above force is removed when the latch mechanism 6 is engaged or about to be engaged. Thereby, the latch mechanism 6 can be properly engaged without being impeded by the hinge structure 5.

Figure 6:
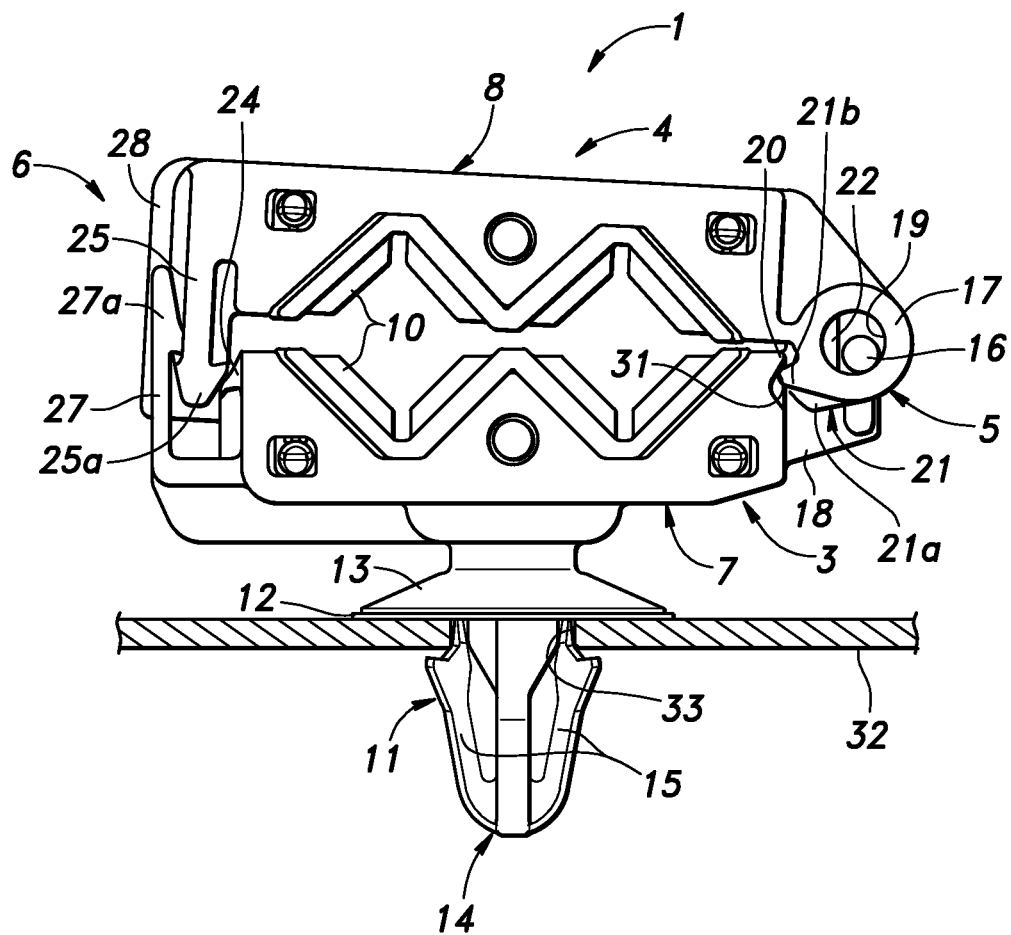
FIG. 6 is a front view of the clamp in a third intermediate position.

When the lid member 4 is closed upon the base member 3 further to a third intermediate position shown in FIG. 6 where the latch mechanism 6 is about to be engaged, the second abutting portions 21 no longer abut the first abutting portions 20, and the first projections 22 no longer abut the side wall 8b of the lid member 4. By this time, the engagement wall 28 is fully received by the first slot 29 and the second slot 30 so that the lateral movement of the lid member 4 relative to the base member 3 at the latch mechanism 6 is positively and favorably restricted. When the engagement wall 28 is inserted into the first slot 29 and the second slot 30, the engagement wall 28 is guided by the slanted side walls 29a (see FIG. 3) and 30a (see FIG. 2), the part of the lid member 4 adjacent to the latch mechanism 6 is laterally positioned correctly.

Figure 7:
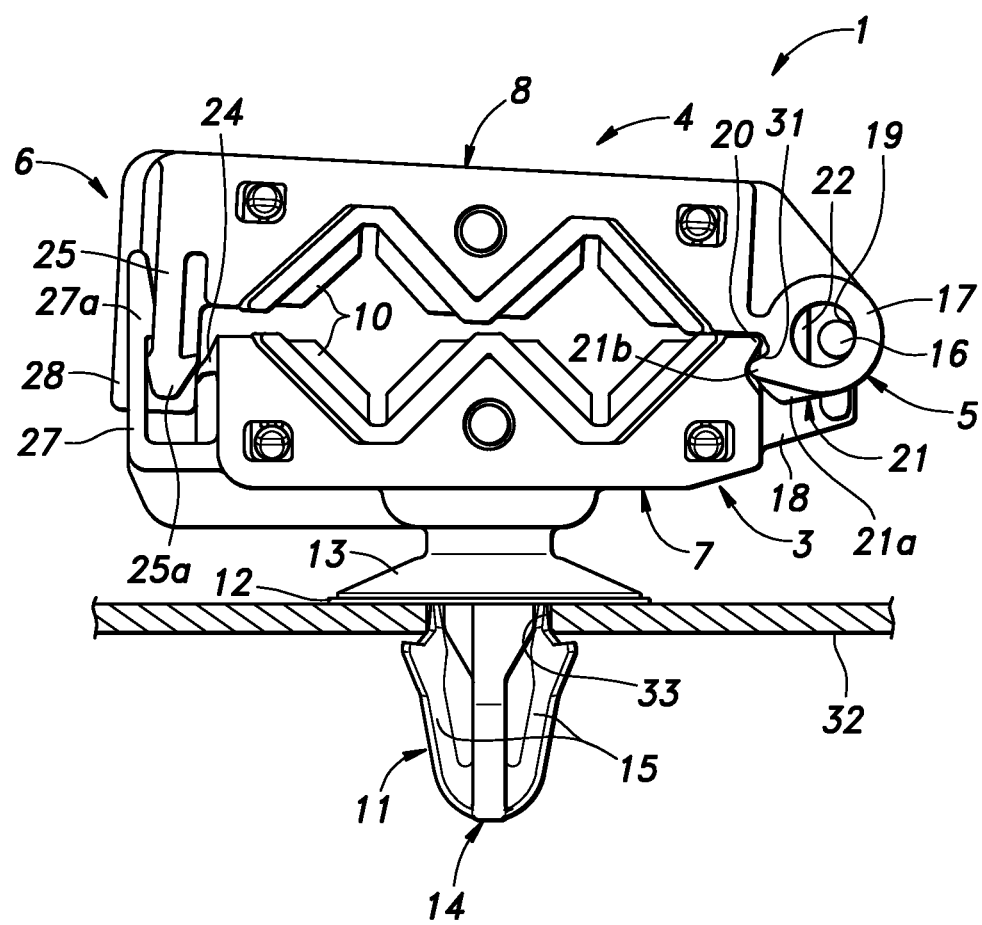
FIG. 7 is a front view of the clamp in a fourth intermediate position.

When the lid member 4 is closed upon the base member 3 further to a fourth intermediate position shown in FIG. 7 where the barb 25a of the first engagement claw 25 rides over the first engagement portion 24 so that the lid member 4 is urged leftward relative to the base member 3 in FIG. 7. As a result, each second abutting portion 21 (in particular the sharp peak 21b of the crest portion 21a thereof) is received into the undercut recess 31 formed in the corresponding first abutting portion 20 so that the leftward movement of the lid member 4 is accommodated.

Figure 8:
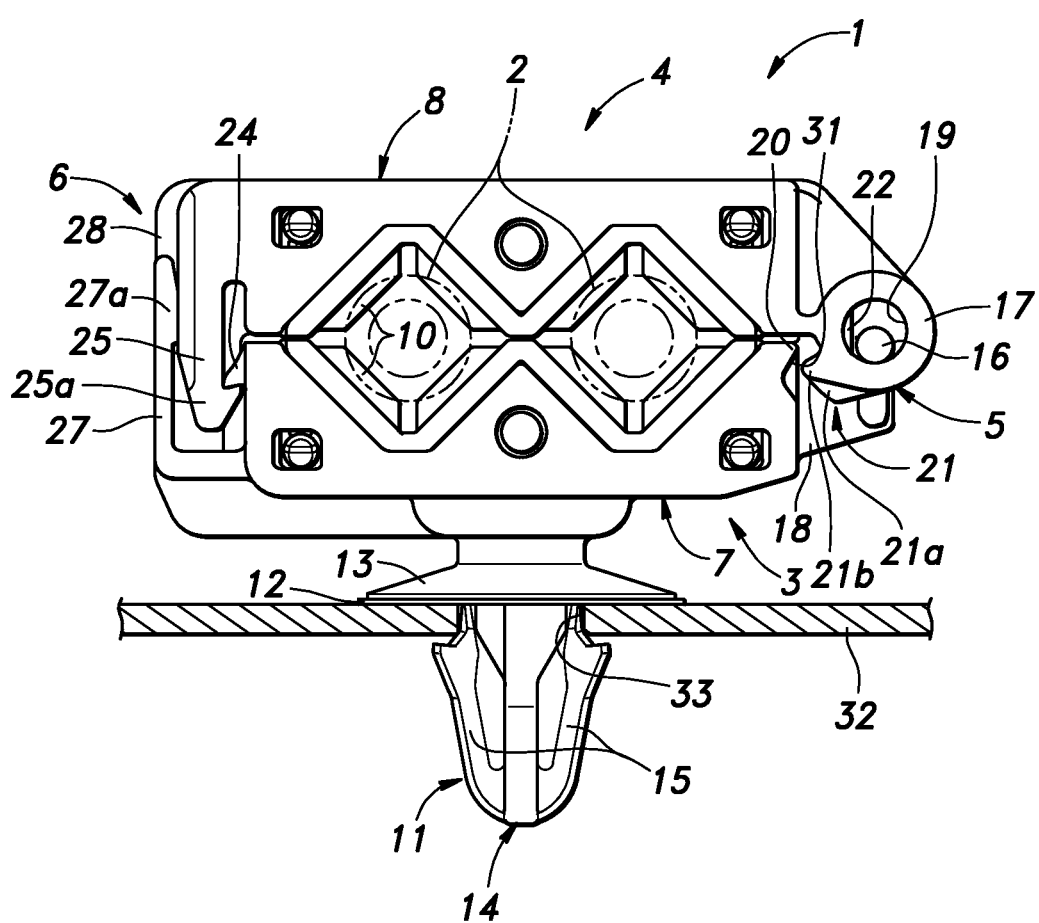
FIG. 8 is a front view of the clamp in a closed position.

FIG. 8 shows the fully closed position of the clamp 1. Since the barb 25a of the first engagement claw 25 has cleared the first engagement portion 24, the lid member 4 is slightly displaced to the right from the fourth intermediate position taken in FIG. 7. As mentioned earlier, each second abutting portion 21 (in particular the sharp peak 21b of the crest portion 21a thereof) may still be received in the undercut recess 31 so that the upward movement of the lid member 4 in the part thereof adjacent to the hinge structure 5 may be positively prevented.

The present invention has been described in terms of a specific embodiment, but the present invention is not limited by such an embodiment, and can be modified in various ways without departing from the spirit of the present invention. For instance, it is also possible to provide the hinge pin 16 on the lid member 4 while providing the bearing holes 19 in the base member 3. Also, the first projections 22 may be provided on the lid member 4 while the second projection 23 may be provided on the base member 3. Further, the undercut recess 31 may be provided on each second abutting portion 21 so as to receive the corresponding first abutting portion 20 in the fourth intermediate position.

Further, in the foregoing embodiment, the force that urges the hinge pin 16 against the bearing portion 17 defining the bearing hole 19 was created as a composite force given as a combination of the force created by the abutment between the first abutting portion 20 and the second abutting portion 21, and the force created by the abutment between the first projection 22 and the side wall 8b, but the creation of the urging force acting between the base member 3 and the lid member 4 as a composite force is not essential to the present invention, and one of the abutment between the first abutting portion 20 and the second abutting portion 21 and the abutment between the first projection 22 and the side wall 8b may be omitted without departing from the spirit of the present invention. For instance, it is possible to create the urging force acting between the base member 3 and the lid member 4 solely by the abutment between the first abutting portion 20 and the second abutting portion 21 by suitably configuring the first abutting portion 20 and the second abutting portion 21. Such an arrangement may require the first abutting portion 20 and/or the second abutting portion 21 to be shaped in such a complex manner that the molding of such a structure may create some difficulty in designing and manufacturing. When the desired force is created as a combination of the force created by the abutment between the first abutting portion 20 and the second abutting portion 21, and the force created by the abutment between the first projection 22 and the side wall 8b, the force directed in the desired direction can be created without any such difficulty.

The invention claimed is:

1. A hinge device, comprising:
   a first member having a hinge pin extending in a lateral direction; and
   a second member having a bearing portion defining a bearing hole loosely receiving the hinge pin so that the first and second members can rotate relative to each other from an open position to a closed position, the bearing hole forming a hinge structure jointly with the hinge pin;
   wherein the first member is provided with a first abutting portion adjacent to the hinge pin, and the second member is provided with a second abutting portion adjacent to the bearing hole, the first abutting portion and the second abutting portion being configured to abut each other in a direction orthogonal to an axial line of the hinge pin when an angle formed by the first member and the second member is within a first angular range preceding the closed position,
   wherein one of a part of the first member adjacent to the hinge pin and a part of the second member adjacent to the bearing hole is provided with a first projection which is configured to abut an engagement part provided on another of the part of the first member adjacent to the hinge pin and the part of the second member adjacent to the bearing hole when the angle formed by the first member and the second member is within a second angular range preceding the closed position,
   wherein the first angular range and the second angular range at least partly overlap with each other, and a force applied to the second member by an abutment between the first projection and the engagement part contains a component which is directed in an opposite direction from a force applied to the second member by an abutment between the first abutting portion and the second abutting portion, and
   wherein the first abutting portion includes a pair of first abutting portions laterally spaced from each other along the hinge pin of the first member, and the second abutting portion includes a pair of second abutting portions laterally spaced from each other along the bearing hole of the second member, the first projection being provided between the first abutting portions or between the second abutting portions.

2. The hinge device according to claim 1, wherein the first projection is provided between the pair of first abutting portions or between the second abutting portions.

3. The hinge device according to claim 1, wherein the first projection includes a pair of first projections laterally spaced from each other, and the engagement part includes a second projection that can be received between the first projections.

4. The hinge device according to claim 1, wherein a tip part of the first projection that comes into abutment with the engagement part as the first and second members rotate relative to each other toward the closed position is rounded or tapered.

5. The hinge device according to claim 1, further comprising a latch mechanism for selectively engaging ends of the first member and the second member remote from the hinge structure with each other to maintain the closed position of the first and second members,
   the latch mechanism comprising:
   an engagement portion provided in a part of the first member remote from the hinge structure so as to project away from the hinge pin; and
   a first engagement claw extending in a closing direction from a part of the second member remote from the hinge structure and having a tip end projecting toward the bearing hole and configured to be engaged by the engagement portion of the first member in the closed position of the first and second members,
   wherein one of the first abutting portion and the second abutting portion is formed with an undercut recess configured to at least partly receive the other of the first abutting portion and the second abutting portion when the first and second members are adjacent to the closed position.

6. The hinge device according to claim 5, wherein the engagement portion and/or the first engagement claw is provided with resiliency so that the undercut recess receives the other of the first abutting portion and the second abutting portion when the first and second members are in the closed position.

7. A clamp, comprising:
   the hinge device according to claim 1; and
   a latch mechanism configured to selectively engage ends of the first member and the second member remote from the hinge structure with each other to maintain the closed position of the first and second members to clamp an object between the first member and the second member;
   the clamp being configured such that a reaction applied by the clamped object to the first member and the second member in the closed position causes the hinge pin to be pressed against a predetermined part of the bearing portion defining the bearing hole;
   wherein the first abutting portion and the second abutting portion are configured to abut each other when the angle formed by the first member and the second member corresponds to a prescribed state of the clamp preceding the closed position in such a manner that a force directed to press the hinge pin onto a substantially same part of the bearing portion defining the bearing hole as the predetermined part is created by an abutment between the first abutting portion and the second abutting portion.

8. A clamp, comprising:
   the hinge device according to claim 1; and
   a latch mechanism configured to selectively engage ends of the first member and the second member remote from the hinge structure with each other to maintain the closed position of the first and second members to clamp an object between the first member and the second member;
   the clamp being configured such that a reaction applied by the clamped object to the first member and the second member in the closed position causes the hinge pin to be pressed against a predetermined part of the bearing portion defining the bearing hole,
   wherein the first abutting portion and the second abutting portion are configured to abut each other when the angle formed by the first member and the second member corresponds to a prescribed state of the clamp preceding the closed position, and the first projection and the engagement part are configured to abut each other when the angle formed by the first member and the second member corresponds to the prescribed state of the clamp preceding the closed position in such a manner that a force directed to press the hinge pin onto a substantially same part of the bearing portion defining the bearing hole as the predetermined part is created jointly by an abutment between the first abutting portion and the second abutting portion and an abutment between the first projection and the engagement part abutting each other.

* * * * *